United States Patent
Baer, Jr.

(10) Patent No.: US 8,132,541 B1
(45) Date of Patent: Mar. 13, 2012

(54) ROTATING HAIRBRUSH DEVICE

(76) Inventor: Thomas L. Baer, Jr., Somerset, PA (US)

( * ) Notice: Subject to any disclaimer, the term of this patent is extended or adjusted under 35 U.S.C. 154(b) by 143 days.

(21) Appl. No.: 12/645,136

(22) Filed: Dec. 22, 2009

(51) Int. Cl.
*A01K 29/00* (2006.01)
*A45D 24/00* (2006.01)
*A45D 24/08* (2006.01)
*A47L 21/02* (2006.01)

(52) U.S. Cl. ............... 119/664; 132/119.1; 132/243; 15/23

(58) Field of Classification Search ............ 132/119.1, 132/212, 120, 219, 121, 132, 238, 271, 313, 132/226, 243, 237, 244, 103, 148, 241, 143; 119/600, 608, 609, 612, 615, 627, 633, 664, 119/625; 15/22.1, 21.1, 23, 169, 179, 3, 15/344

See application file for complete search history.

(56) References Cited

U.S. PATENT DOCUMENTS

| | | | |
|---|---|---|---|
| 663,697 A * | 12/1900 | Gano | 119/608 |
| 1,025,793 A * | 5/1912 | Endsley | 119/612 |
| 3,384,096 A * | 5/1968 | Paccione | 132/119.1 |
| 3,386,453 A * | 6/1968 | Roberts et al. | 132/119.1 |
| 3,431,571 A * | 3/1969 | Kraus | 15/23 |
| 3,451,086 A * | 6/1969 | Burgett | 15/23 |
| 3,890,984 A | 6/1975 | Lesetar | |
| 4,084,282 A * | 4/1978 | Calvert | 15/38 |
| 4,116,205 A * | 9/1978 | Owen et al. | 132/313 |
| 4,202,067 A * | 5/1980 | Stamatovic | 15/28 |
| 4,280,517 A * | 7/1981 | Ihara | 132/212 |
| 4,302,122 A * | 11/1981 | Moya | 401/268 |
| 4,313,237 A * | 2/1982 | Smith | 15/23 |
| 4,944,319 A | 7/1990 | Trombley | |
| 5,427,120 A * | 6/1995 | Wong | 132/120 |
| 5,462,018 A | 10/1995 | Louison | |
| 5,509,378 A * | 4/1996 | Kimura | 119/601 |
| 5,511,270 A | 4/1996 | Eliachar et al. | |
| 5,690,545 A * | 11/1997 | Clowers et al. | 451/359 |
| 6,067,724 A * | 5/2000 | Depoyian | 34/97 |
| 6,098,635 A | 8/2000 | Marino | |
| 6,158,073 A * | 12/2000 | Jiovanni | 15/23 |
| D439,051 S | 3/2001 | White | |
| 6,196,235 B1 * | 3/2001 | Kim | 132/148 |
| 6,421,872 B1 | 7/2002 | Sciandivasci | |
| 7,264,004 B2 * | 9/2007 | Djulbegovic | 132/227 |
| 7,353,777 B2 | 4/2008 | Morosin et al. | |
| 7,665,422 B2 * | 2/2010 | Kissel, Jr. | 119/609 |
| 7,748,071 B2 * | 7/2010 | Hafliger et al. | 15/22.1 |
| 7,854,214 B2 * | 12/2010 | Khubani et al. | 119/625 |
| 2003/0131865 A1 | 7/2003 | Richmond et al. | |
| 2003/0192564 A1 * | 10/2003 | Johnson | 132/119.1 |
| 2004/0060571 A1 * | 4/2004 | Mayeri | 132/121 |
| 2004/0200495 A1 * | 10/2004 | Lin | 132/119.1 |
| 2005/0016557 A1 * | 1/2005 | Fasan | 132/132 |
| 2007/0084416 A1 * | 4/2007 | Liao | 119/625 |

(Continued)

*Primary Examiner* — Todd Manahan
*Assistant Examiner* — Vanitha Elgart

(57) ABSTRACT

A rotating hairbrush device featuring a base; a brush component, the bottom portion pivotally attached to the base, the brush component can pivot in a first direction and a second direction and be secured in various positions forming an angle with respect to the base; a shell with bristles removably attachable to the upper portion of the brush component; a guard component attached to the bottom portion of the brush component, the guard component extends outwardly from the brush component and together with the brush component the guard component sandwiches a portion of the bristles, wherein teeth are disposed on a first side edge of the guard component; and a motor disposed and flexible drive shaft that function to drive rotation of the upper portion of the brush component.

15 Claims, 5 Drawing Sheets

U.S. PATENT DOCUMENTS

| | | |
|---|---|---|
| 2007/0095362 A1* | 5/2007 | Koopah .............................. 134/1 |
| 2007/0169720 A1 | 7/2007 | Roy |
| 2008/0022484 A1* | 1/2008 | Caruso ............................ 15/344 |
| 2010/0307519 A1* | 12/2010 | Couillard ....................... 132/120 |
| 2011/0017225 A1* | 1/2011 | Devulapalli ................... 132/118 |
| 2011/0056505 A1* | 3/2011 | Parkinson et al. ............. 132/120 |

\* cited by examiner

ROTATING HAIRBRUSH DEVICE

FIELD OF THE INVENTION

The present invention is directed to a brush for brushing hair such as pet hair, more particularly to a brush that rotates about its handle via a motor.

BACKGROUND OF THE INVENTION

Pets need to be frequently groomed, and grooming can be very time consuming for the pet owner. For example, brushing a pet can take a long period of time and require that the pet owner have a great deal of arm strength. The present invention features a rotating hairbrush device for brushing pets. The device of the present invention may help a user remove loose pet hairs quickly and easily.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a rotating hairbrush device comprising: (a) a generally elongated base having a first end, a second end, and an inner cavity; (b) a brush component divided into a bottom portion pivotally attached to the first end of the base via a hinge and an upper portion, wherein the brush component can pivot in a first direction and a second direction with respect to the base, the brush component can be secured in at least a first position, a second position, and a third position, wherein in the first position the brush component forms a first angle with respect to the base, the first angle being between about 40 to 50 degrees, wherein in the second position the brush component forms a second angle with respect to the base, the second angle being between about 20 to 30 degrees, wherein the third position the brush component forms a third angle with respect to the base, the third angle being about 0 degrees; (c) a shell with bristles removably attachable to the upper portion of the brush component, the shell with bristles can be temporarily secured to the upper portion of the brush component via a locking means; (d) a guard component attached to the bottom portion of the brush component, the guard component extends outwardly from the brush component and together with the brush component the guard component sandwiches a portion of the bristles wherein teeth are disposed on a first side edge of the guard component; and (e) a motor disposed in the inner cavity of the base and operatively connected to a flexible drive shaft that extends to the brush component, the motor and flexible drive shaft function to drive rotation of the upper portion of the brush component in a first direction or a second direction with respect to the bottom portion of the brush component, wherein the motor is operatively connected to a battery and operatively connected to a control button disposed on the base, the control button can move between an on position wherein the motor is activated and an of position wherein the motor is deactivated.

DESCRIPTION OF PREFERRED EMBODIMENTS

Figure 1:
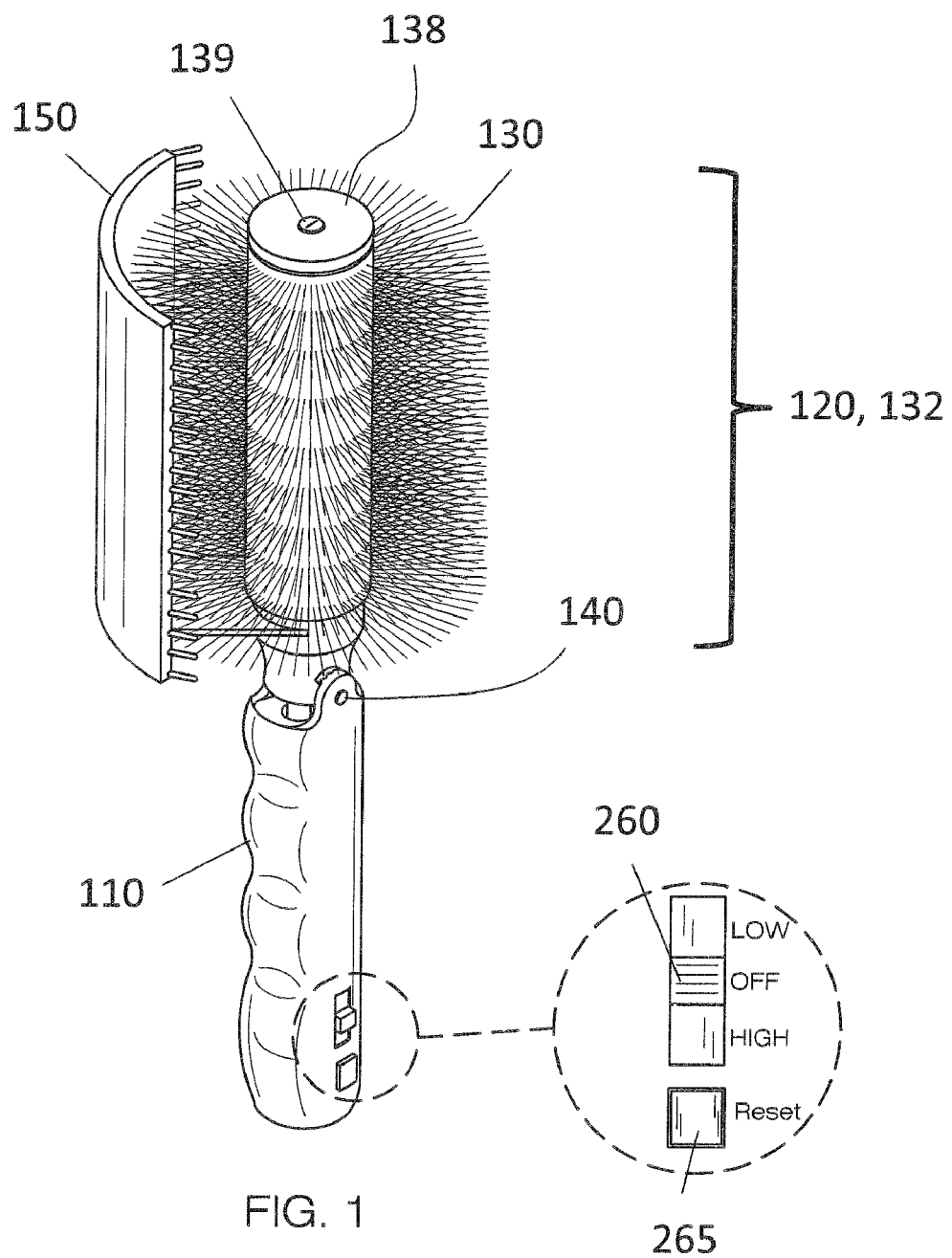
FIG. 1 is a perspective view of a rotating hairbrush device of the present invention.

Referring now to FIGS. 1-6, the present invention features a rotating hairbrush device 100. The rotating hairbrush device 100 may be used for pets to help remove loose hairs quickly and easily.

The rotating hairbrush device 100 of the present invention comprises a generally elongated base 110 having a first end, a second end, and an inner cavity. The base 110 functions as a handle. In some embodiments, the base is constructed with a molded handgrip (or the like) for providing a comfortable means in which the user can grip the device 100 (e.g., base 110).

Disposed (e.g., pivotally) on the first end of the base 110 is a brush component 120. In some embodiments, the brush component 120 is generally cylindrical and has a first end and a second end. The brush component 120 is pivotally attached to the base 110 via a hinge 140. The brush component 120 may be divided into a bottom portion (e.g., the second end of the brush component 120 that is attached to the hinge 140) and an upper portion.

Figure 2:
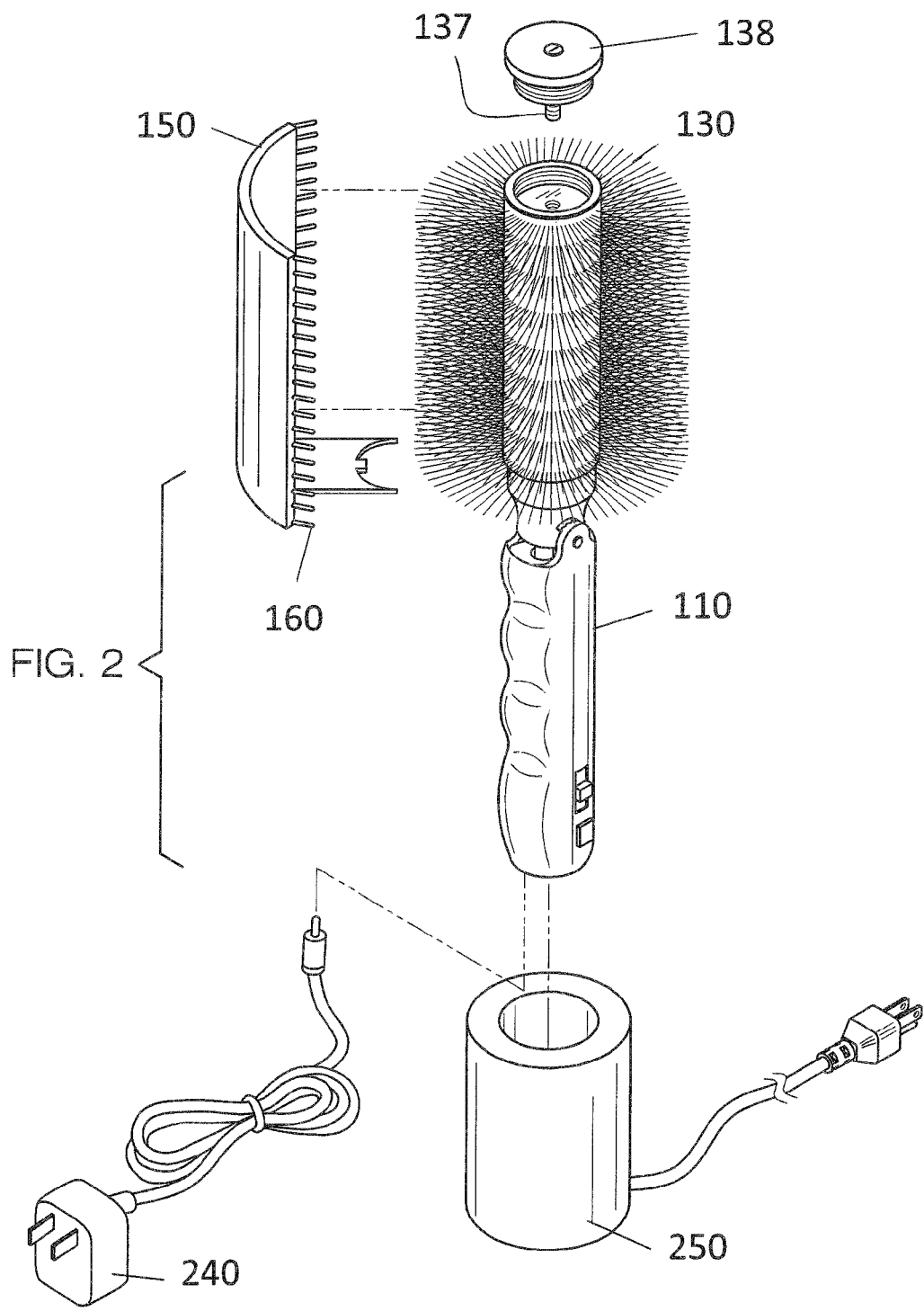
FIG. 2 is an exploded view of the rotating hairbrush device of FIG. 1.
Figure 3:
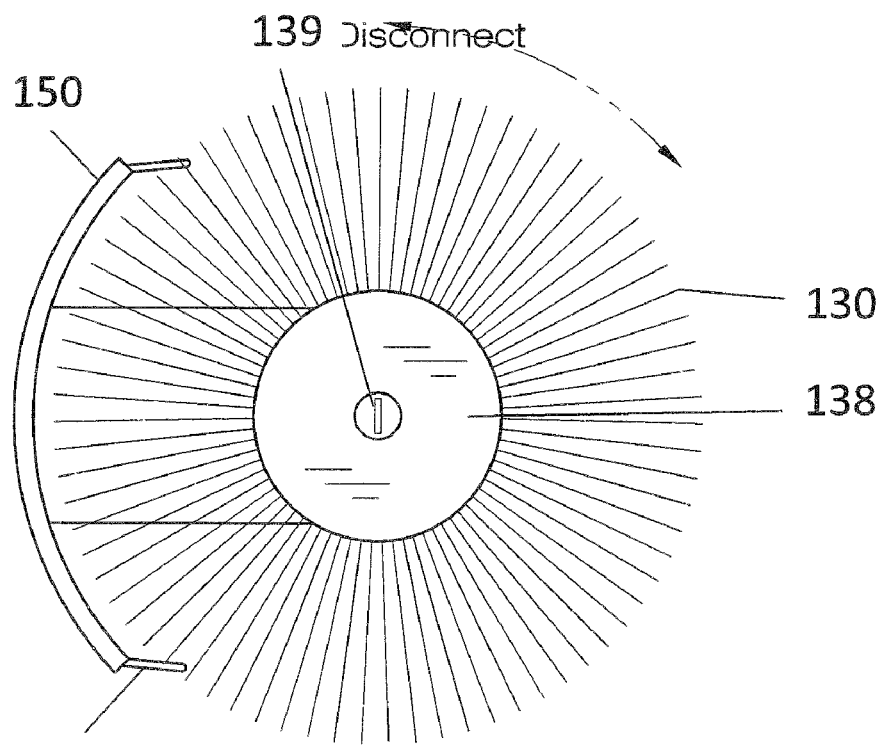
FIG. 3 is a top view of the of the rotating hairbrush device of FIG. 1.
Figure 4:
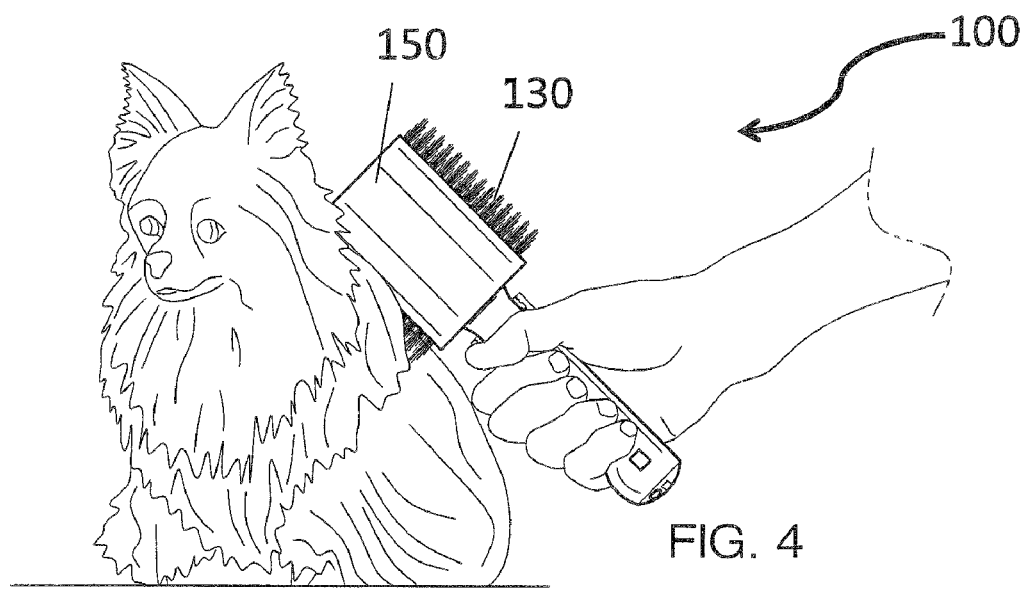
FIG. 4 is a perspective view of the rotating hairbrush device of FIG. 1 in use.

The brush component 120 is configured such that a shell 132 (e.g., a hollow cylindrical shell) with bristles 130 can be attached. The shell 132 with bristles 130 can be slid onto the brush component 120 and is temporarily attached to the brush component 120. The shell 132 with bristles 130 may be attached to the upper portion of the brush component 120. Temporary attachment allows for the shell 132 with bristles 130 to be removed and replaced with a different shell 132 with bristles 130. In some embodiments, the shell 132 with bristles 130 can be secured to the brush component 120 via a locking means. As shown in FIG. 2, in some embodiments, the locking means is a cap 138. In some embodiments, the cap 138 can be locked down via a button 139 (e.g., a quick release button) or a screw mechanism 137. The locking means is not limited to the aforementioned examples.

Bristles are well known to one of ordinary skill in the art. The bristles 130 may be constructed in a variety of styles. For example, in some embodiments, the bristles 130 are soft and/or flexible. In some embodiments, the bristles 130 are semi-rigid or rigid. Such textures and styles of bristles are well known to one of ordinary skill in the art.

The second end of the brush component 120 is pivotally attached to the first end of the base 110 via a hinge component 140 such that the brush component 120 can pivot with respect to the base 110. In some embodiments, the brush component 120 can pivot in a first direction and/or a second direction. The brush component 120 may be securable in a particular position (e.g., via a securing means). The securing means may function to lock the hinge 140. In some embodiments, the brush component 120 can be secured in a first position, the first position being where the brush component 120 forms a first angle with respect to the base 110. The first angle may be about 45 degrees (see FIG. 6). In some embodiments, the brush component 120 can be secured in a second position, the second position being where the brush component 120 forms a second angle with respect to the base 110. The second angle may be about 22 degrees. In some embodiments, the brush component 120 can be secured in a third position, the third position being where the brush component 120 forms a third angle with respect to the base 110. The third angle may be about 0 degrees (e.g., the brush component 120 is aligned with the base 110, see FIG. 1). The present invention is not limited to the aforementioned positions. For example, in some embodiments, the first angle is between about 40 to 50 degrees. In some embodiments, the first angle is between about 30 to 40 degrees. In some embodiments, the first angle is between about 50 to 60 degrees. In some embodiments, the first angle is more than about 60 degrees. In some embodiments, the second angle is between about 20 to 30 degrees. In some embodiments, the second angle is between about 10 to 20 degrees. In some embodiments, the third angle is between about 0 to 10 degrees.

Without wishing to limit the present invention to any theory or mechanism, it is believed that the flexibility of the brush device 100 of the present invention (e.g., the pivoting of the brush component 120 with respect to the base 110) is advantageous because it provides versatility. For example, a user can choose a position for the brush component 120 based on what is comfortable or most effective.

A guard component 150 extends outwardly from the brush component 120 or shell with bristles 130. The guard component 150 may be an elongated curved panel, for example shaped like a half-pipe. The guard component 150 may surround a portion of the bristles 130 attached to the shell 132 (e.g., a portion of the bristles 130 are sandwiched between the guard component and the shell 132 and brush component 120). In some embodiments, the guard component 150 is attached to the brush component 120 or to the shell 132 via an attachment means. The attachment means may attach to the brush component 120, for example at the second end (e.g., the bottom portion of the brush component 120).

In some embodiments, teeth 160 are disposed on the guard component 150. The teeth 160 may help to collect debris (e.g., loose hairs) as the device 100 is being used (e.g., as the bristles 130 collect pet hairs). In some embodiments, the teeth 160 may extend through a portion of the bristles 130 (e.g., to help clean hair from the bristles 130). The teeth 160 may be disposed on a first side edge of the guard component 150 and/or a second side edge of the guard component 150.

The brush component 120 (e.g., the bottom portion) is pivotally attached to the base 110 via the hinge 140. The upper portion of the brush component 120 can rotate in a first direction (e.g., a forward direction) and a second direction (e.g., a reverse direction) with respect to the bottom portion.

A motor 180 is disposed in the base 110 (e.g., in the inner cavity of the base 110). The motor 180 functions to drive the rotation of the upper portion of the brush component 120. In some embodiments, the motor 180 is operatively connected to a flexible drive shaft 210, the flexible drive shaft 210 being operatively connected to the brush component 120. Flexible drive shafts are well known to one of ordinary skill in the art. The motor 180 drives the rotation of the flexible drive shaft 210, which causes the upper portion of the brush component 120 to rotate with respect to the bottom portion of the brush component 120. The flexible drive shaft 210 may extend through the hinge 140 or around the hinge 140. The flexible drive shaft 210 provides a means of rotating the brush component 120 even when the brush component 120 is pivoted with respect to the shaft 110.

Figure 5:
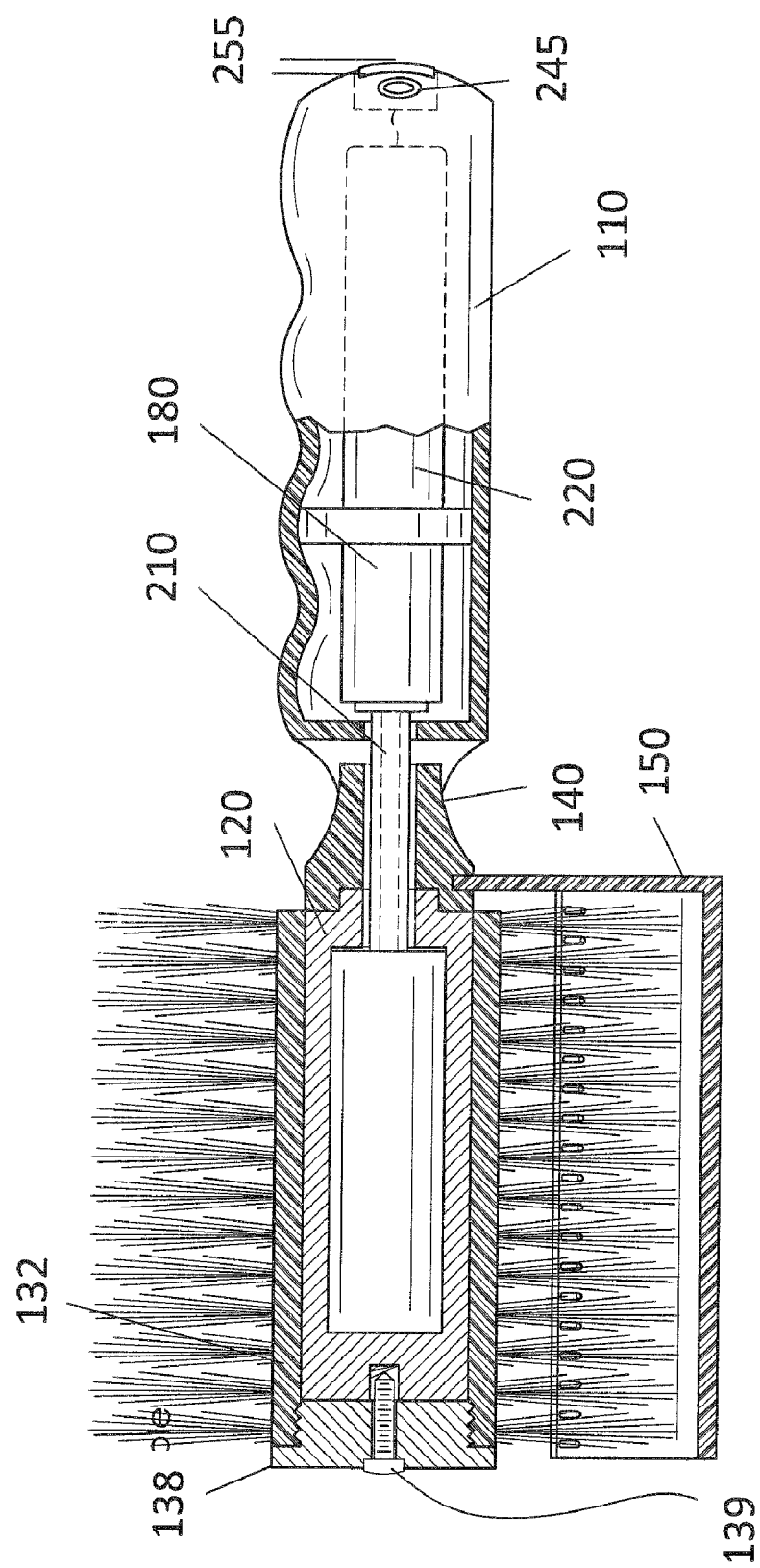
FIG. 5 is a cross sectional view of the rotating hairbrush device of FIG. 1.
Figure 6:
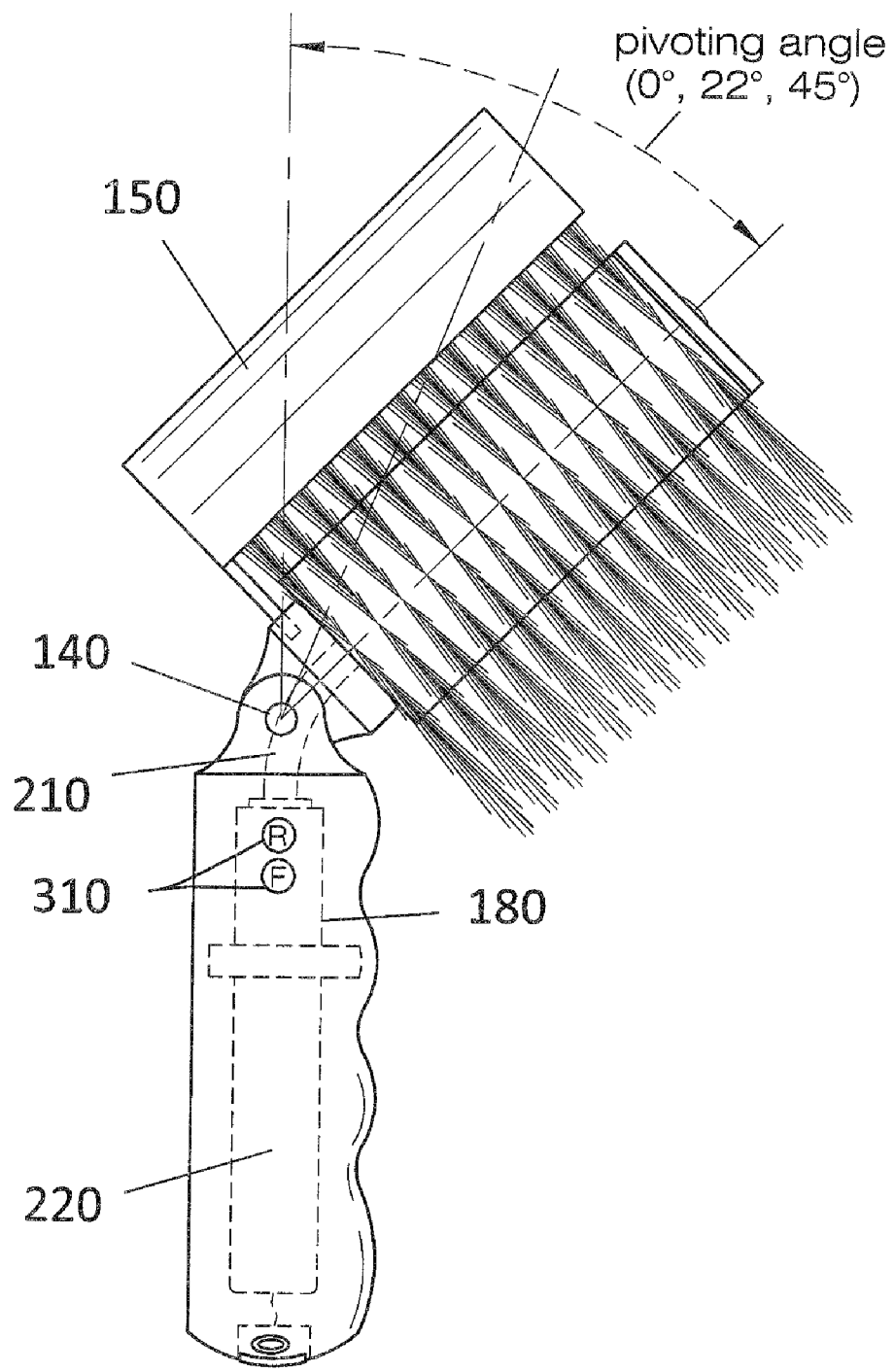
FIG. 6 is a side view of a rotating hairbrush device of the present invention.

The motor 180 is operatively connected to a power source. In some embodiments, the power source is a battery 220. In some embodiments, the battery is a rechargeable battery. As shown in FIG. 2, in some embodiments the battery 220 (e.g., rechargeable battery) may be operatively connectable to a secondary power source for recharging purposes. The secondary power source may be an electrical outlet (the battery 220 can be operatively connected to the secondary power source via a power cord 240.). In some embodiments, the battery 220 can be operatively connected to the secondary power source via a charging station 250. Power cords and charging stations for rechargeable batteries are well known to one of ordinary skill in the art. As shown in FIG. 5, in some embodiments, metal contacts 255 are disposed on the base 110 for contacting contacts in the charging station 250. In some embodiments, a jack 245 is disposed on the base 110 for connecting the power cord 240.

The motor 180 is operatively connected to a control button 260. The control button 260 may be disposed on the base 110 for example. The control button 260 can move between an on position wherein the motor 180 is activated and an off position wherein the motor 180 is deactivated. In some embodiments, the control button 260 allows for control of the speed of the motor 180 (e.g., the speed of the rotation of the brush component 120). The control button 260 may provide for a low speed setting, a medium speed setting, and/or a high speed setting. Control buttons for turning devices on and off as well as for controlling speed of a feature are well known to one of ordinary skill in the art. In some embodiments, the device comprises a circuit breaker-reset button system. Circuit breaker-reset button systems are well known to one of ordinary skill in the art and are generally used to help prevent damage to the device due to fluctuations in power (e.g., power overload). In some embodiments, the reset button 265 is disposed on the base 110.

The upper portion of the brush component 120 can rotate in a first direction (e.g., a forward direction) or a second direction (e.g., a reverse direction) with respect to the bottom portion of the brush component 120. In some embodiments, the drive shaft and/or motor 180 is operatively connected to a directional button 310 that can control whether the brush component 120 rotates in the first direction or the second direction. Directional control buttons are well known to one of ordinary skill in the art. For example, a user can set the directional control button 310 to a first setting to allow the brush component 120 to rotate in the first direction (e.g., a forward direction), or the user can set the directional control button 310 to a second setting to allow the brush component 120 to rotate in a second direction (e.g., a reverse direction).

The rotating hairbrush device 100 of the present invention may be constructed in a variety of sizes. For example, in some embodiments, the device 100 is between about 6 to 10 inches in length as measured from the first end of the brush component 120 to the second end of the base 110. In some embodiments, the device 100 is between about 10 to 14 inches in length as measured from the first end of the brush component 120 to the second end of the base 110. In some embodiments, the device 100 is more than about 14 inches in length.

As used herein, the term "about" refers to plus or minus 10% of the referenced number. For example, an embodiment wherein the device 100 is about 10 inches in length includes a device 100 that is between 9 and 11 inches in length.

The following the disclosures of the following U.S. patents are incorporated in their entirety by reference herein: U.S. Pat. No. 6,098,635; U.S. Pat. Application No. 2003/0131865; U.S. Pat. No. 4,944,319; U.S. Pat. No. 5,511,270; U.S. Pat. No. 3,890,984; U.S. Pat. Application No. 2007/0169720; U.S. Pat. No. 7,353,777; U.S. Pat. No. 6,421,872; U.S. Pat. No. 5,462,018.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A rotating hairbrush device comprising:
   (a) a generally elongated base having a first end, a second end, and an inner cavity;
   (b) a brush component divided into a bottom portion pivotally attached to the first end of the base via a hinge and an upper portion, wherein the brush component can pivot in a first direction and a second direction with respect to the base, the brush component can be secured in at least a first position, a second position, and a third position, wherein in the first position the brush component forms a first angle with respect to the base, the first angle being between about 40 to 50 degrees, wherein in the second position the brush component forms a second angle with respect to the base, the second angle being between about 20 to 30 degrees, wherein in the third position the brush component forms a third angle with respect to the base, the third angle being about 0 degrees;
   (c) a shell with bristles removably attachable to the upper portion of the brush component, the shell with bristles can be temporarily secured to the upper portion of the brush component via a locking means;
   (d) a guard component attached to the bottom portion of the brush component, the guard component extends outwardly from the brush component and together with the brush component the guard component sandwiches a portion of the bristles, wherein teeth are disposed on a first side edge of the guard component; and
   (e) a motor disposed in the inner cavity of the base and operatively connected to a flexible drive shaft that extends to the brush component, the motor and flexible drive shaft function to drive rotation of the upper portion of the brush component in a first direction or a second direction with respect to the bottom portion of the brush component, wherein the motor is operatively connected to a battery and operatively connected to a control button disposed on the base, the control button can move between an on position wherein the motor is activated and an off position wherein the motor is deactivated.

2. The rotating hairbrush device of claim 1 further comprising a molded handgrip disposed on the base.

3. The rotating hairbrush device of claim 1, wherein the locking means is a cap.

4. The rotating hairbrush device of claim 1, wherein the first angle is about 45 degrees.

5. The rotating hairbrush device of claim 1, wherein the second angle is about 22 degrees.

6. The rotating hairbrush device of claim 1, wherein the third angle is between about 0 to 10 degrees.

7. The rotating hairbrush device of claim 1, wherein the guard component has a half-pipe shape.

8. The rotating hairbrush device of claim 1, wherein the teeth extend through a portion of the bristles.

9. The rotating hairbrush device of claim 1, wherein teeth are disposed on the first side edge of the guard component and a second side edge of the guard component.

10. The rotating hairbrush device of claim 1, wherein the flexible drive shaft extends through the hinge.

11. The rotating hairbrush device of claim 1, wherein the control button controls a speed of the motor.

12. The rotating hairbrush device of claim 1, wherein the battery is a rechargeable battery.

13. The rotating hairbrush device of claim 1 further comprising a removable power cord for operatively connecting the battery to a secondary power source for recharging purposes.

14. The rotating hairbrush device of claim 1 further comprising a charging station for operatively connecting the battery to a secondary power source for recharging purposes.

15. The rotating hairbrush device of claim 1 further comprising a circuit breaker-reset button system.

\* \* \* \* \*